United States Patent
Huo et al.

(10) Patent No.: US 9,591,079 B2
(45) Date of Patent: Mar. 7, 2017

(54) METHOD AND APPARATUS FOR MANAGING SESSIONS OF DIFFERENT WEBSITES

(71) Applicant: INTERNATIONAL BUSINESS MACHINES CORPORATION, Armonk, NY (US)

(72) Inventors: Jia Huo, Beijing (CN); Bing Li, Beijing (CN); Tao G. Liu, Beijing (CN); Ying Chu Wang, Beijing (CN); Kai Zhang, Beijing (CN); Yu Zhu Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 14/151,888

(22) Filed: Jan. 10, 2014

(65) Prior Publication Data

US 2014/0214956 A1   Jul. 31, 2014

(30) Foreign Application Priority Data

Jan. 29, 2013  (CN) .......................... 2013 1 0033883

(51) Int. Cl.
*H04L 29/08* (2006.01)
*G06F 17/30* (2006.01)

(52) U.S. Cl.
CPC ........ *H04L 67/14* (2013.01); *G06F 17/30873* (2013.01); *H04L 67/02* (2013.01);
(Continued)

(58) Field of Classification Search
CPC ................................................ G06F 17/30873
See application file for complete search history.

(56) References Cited

U.S. PATENT DOCUMENTS 6,981,048 B1 * 12/2005 Abdolbaghian ........ H04L 67/14
                                                             709/203
7,302,370 B2    11/2007 Nickerson et al.
(Continued)

FOREIGN PATENT DOCUMENTS

CN         101287013        10/2008
CN         101588393        11/2009

OTHER PUBLICATIONS

P. Mell et al., "The NIST Definition of Cloud Computing", National Institute of Standards and Technology, Information Technology Laboratory, Special Publication 800-145, Sep. 2011, pp. 1-7.
(Continued)

*Primary Examiner* — Shirley Zhang
(74) *Attorney, Agent, or Firm* — Law Office of Jim Boice

(57) ABSTRACT

A method, apparatus, and/or computer program product manages sessions of different websites. Respective session identifiers of a plurality of websites are recorded, where each of the respective session identifiers of the plurality of websites identifies a session established in response to a page open operation for a respective website, and where pages of the plurality of websites are integrated into one page on one website. An operation request for a page of a first website of the plurality of websites is received. In response to receiving the operation request, a session synchronization request message that requests that a session of the first website be synchronized with sessions of the plurality of websites is generated and transmitted from the first website to other websites from the plurality of websites.

12 Claims, 9 Drawing Sheets

(52) U.S. Cl.
CPC ............ *H04L 67/10* (2013.01); *H04L 67/142* (2013.01); *H04L 67/34* (2013.01)

(56) References Cited

U.S. PATENT DOCUMENTS

| | | |
|---|---|---|
| 8,015,240 B2* | 9/2011 | Ng .................... G06F 17/3089 709/202 |
| 8,266,226 B2 | 9/2012 | Narayan et al. |
| 8,332,520 B2 | 12/2012 | Hanai et al. |
| 8,370,901 B2 | 2/2013 | Huang et al. |
| 2012/0179744 A1 | 7/2012 | Sullivan et al. |
| 2012/0204144 A1 | 8/2012 | Fioritoni et al. |
| 2013/0031470 A1* | 1/2013 | Daly, Jr. .......... G06F 17/30893 715/243 |

OTHER PUBLICATIONS

J. Ziegler, "Maintaining Sessions With AJAX Polling and Servlets", Top 21 Customized Media Solutions Techblog, Jan. 25, 2011, pp. 1-3.

\* cited by examiner

METHOD AND APPARATUS FOR MANAGING SESSIONS OF DIFFERENT WEBSITES

This application is based on and claims the benefit of priority from China (CN) Patent Application 2013-10033883.1, filed on Jan. 29, 2013, and herein incorporated by reference in its entirety.

BACKGROUND

The present invention relates to session management technology, and more particularly, to a method and an apparatus for managing sessions of different websites.

In page design of a website, pages from different websites can be integrated into one page. For instance, the pages from other websites may be embedded in one page of one website. Usually, iFrame technology can be used to embed the page. In such case, the page containing another page can be called as container page, and the page embedded in another page can be called as embedded page.

When a user opens a page of a certain website on a browser of a client, a session for the client to access the website will be established at a server of the website, and a session identifier will be generated to identify the session. The session identifier may be obtained from Cookie stored at the client. Usually, the session of the website will be set with session timeout information. If the user does not operate (such as click and the like) on the page of the website within a time period limited by the session timeout information, the situation where the session terminates due to the session timeout occurs.

If the page is embedded with a page of other website, the similar situation would occur. During the user operates on the container page, if the embedded page is not operated on within the time period limited by the corresponding session timeout information, the session corresponding to the embedded page will be time out. On the contrary, during the user operates on the embedded page, if the container page or other embedded page (if any) are not operated on within the time period limited by the corresponding session timeout information, the session corresponding to the container page or other embedded page will also be timeout. In order to avoid such situations, the user may operate on the embedded page or container page at regular intervals to reset the timeout of the session corresponding to the embedded page or container page during the operations on the container page or embedded page, to avoid the session from timeout. However, this is very inconvenient for the user.

There is an existing approach in the prior art to solve the above problem. In this approach, all the servers of the websites provide a keep-alive service such as a servlet for synchronization of session timeout. When the client detects that the user operates on any page in the container page which has the embedded page, the client sends an operation request to the server of the website to which the operated page belongs and also sends a keep-alive request to the server of the website to which other page belongs, so as to avoid the relevant session of other website from timeout. However, this approach requires adding operation codes for each operation at the client to the web application's business logic, which is time consuming and error-prone.

FIG. 4 shows a schematic diagram of an example in which the above approach is implemented. As shown in FIG. 4, the servers of website A and website B are installed with the synchronization servlet for synchronization of session timeout, and the page of the website B is embedded into the page of the website A using iFrame. In this case, the page of the website A is the container page and the page of the website B is the embedded page. During the user operates on the embedded page, an operation request is sent to the server of the website B, and a request for invoking the synchronization servlet is also sent to the server of the website A. The server of the website A synchronizes the session of the website A in response to the request.

SUMMARY

A method, apparatus, and/or computer program product manages sessions of different websites. Respective session identifiers of a plurality of websites are recorded, where each of the respective session identifiers of the plurality of websites identifies a session established in response to a page open operation for a respective website, and where pages of the plurality of websites are integrated into one page on one website. An operation request for a page of a first website of the plurality of websites is received. In response to receiving the operation request, a session synchronization request message that requests that a session of the first website be synchronized with sessions of the plurality of websites is generated and transmitted from the first website to other websites from the plurality of websites.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
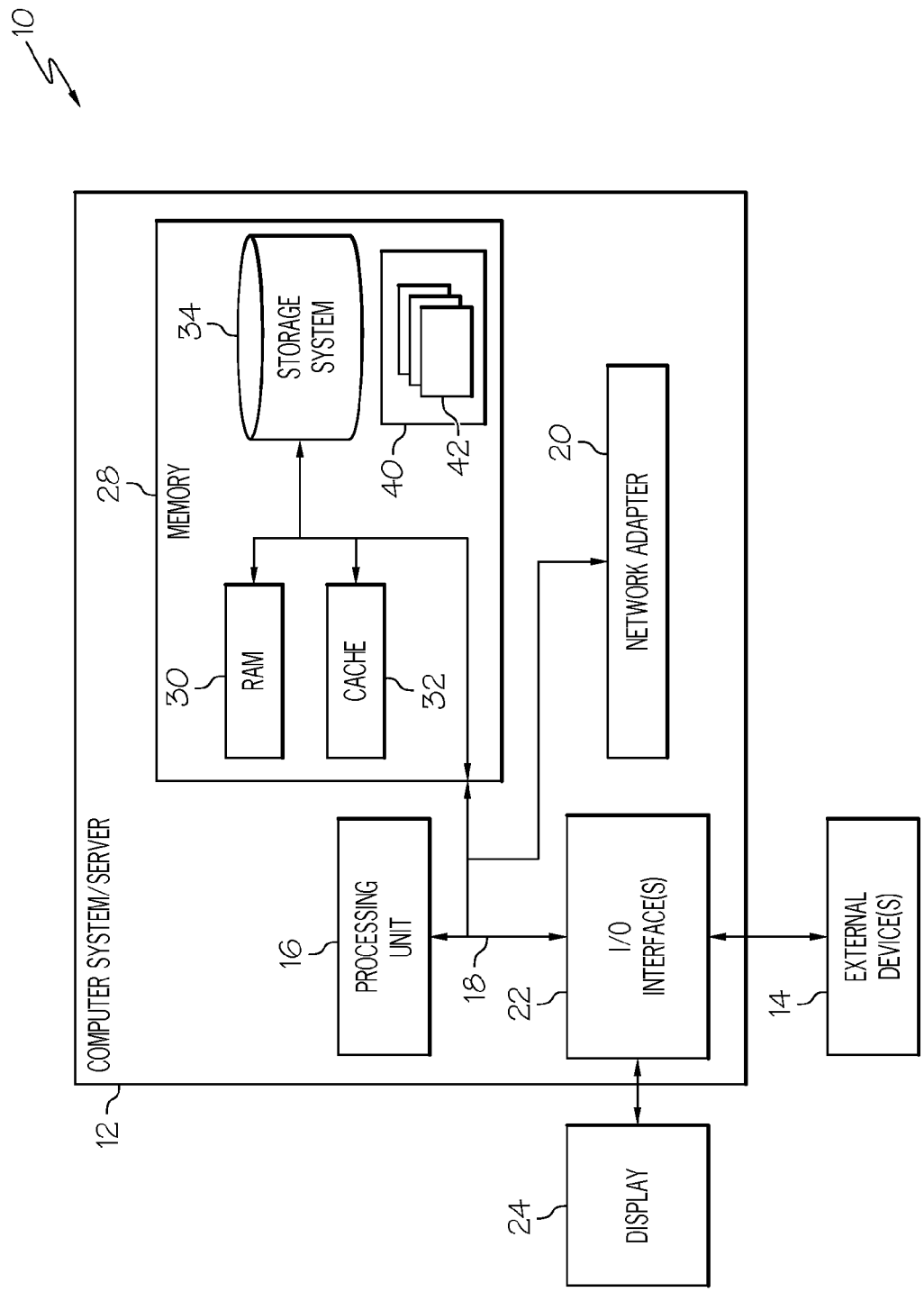
FIG. 1 depicts a cloud computing node according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
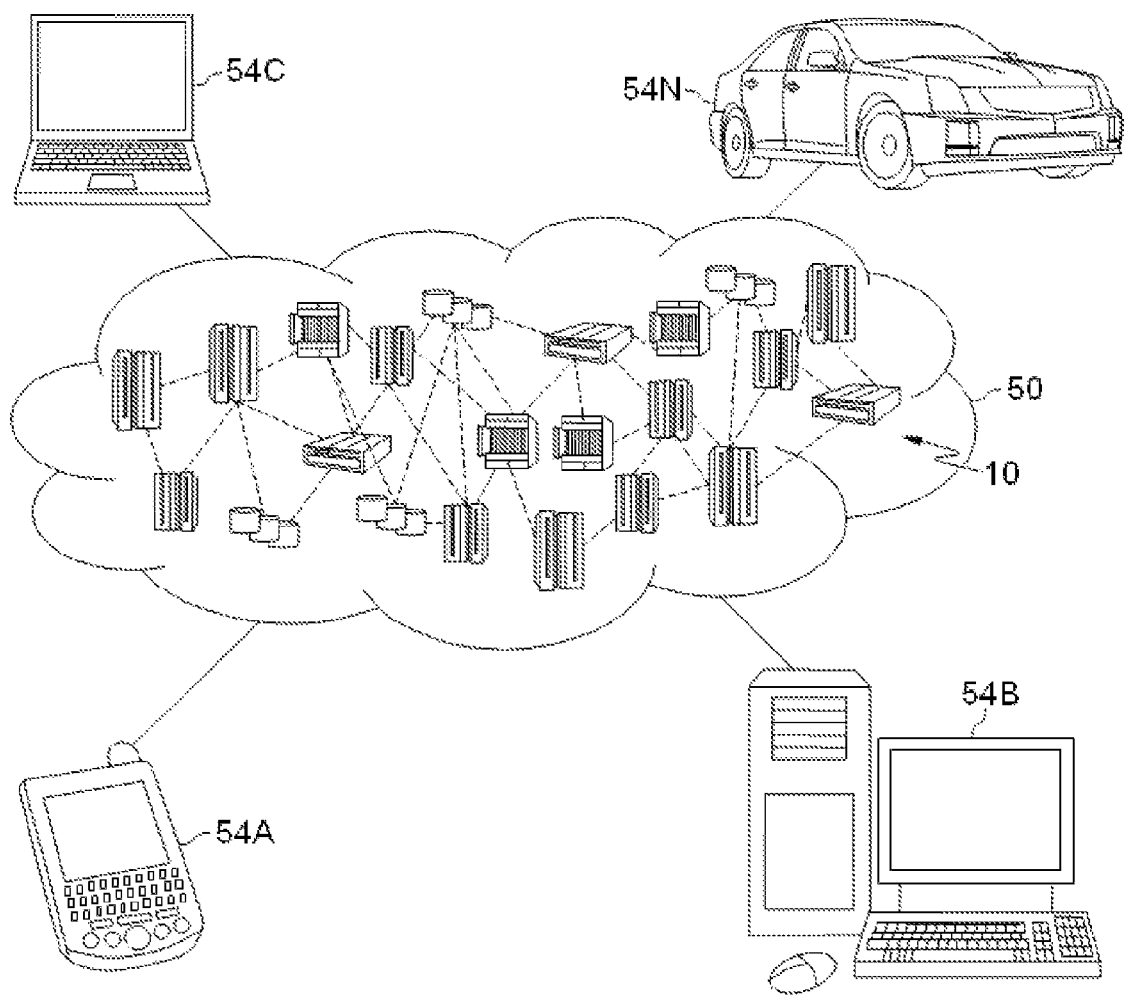
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone MA, desktop computer MB, laptop computer MC, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices MA-N shown in FIG. 2 are intended to be illustrative only and that computing nodes 10 and cloud computing environment 50 can communicate with any type of computerized device over any type of network and/or network addressable connection (e.g., using a web browser).

Figure 3:
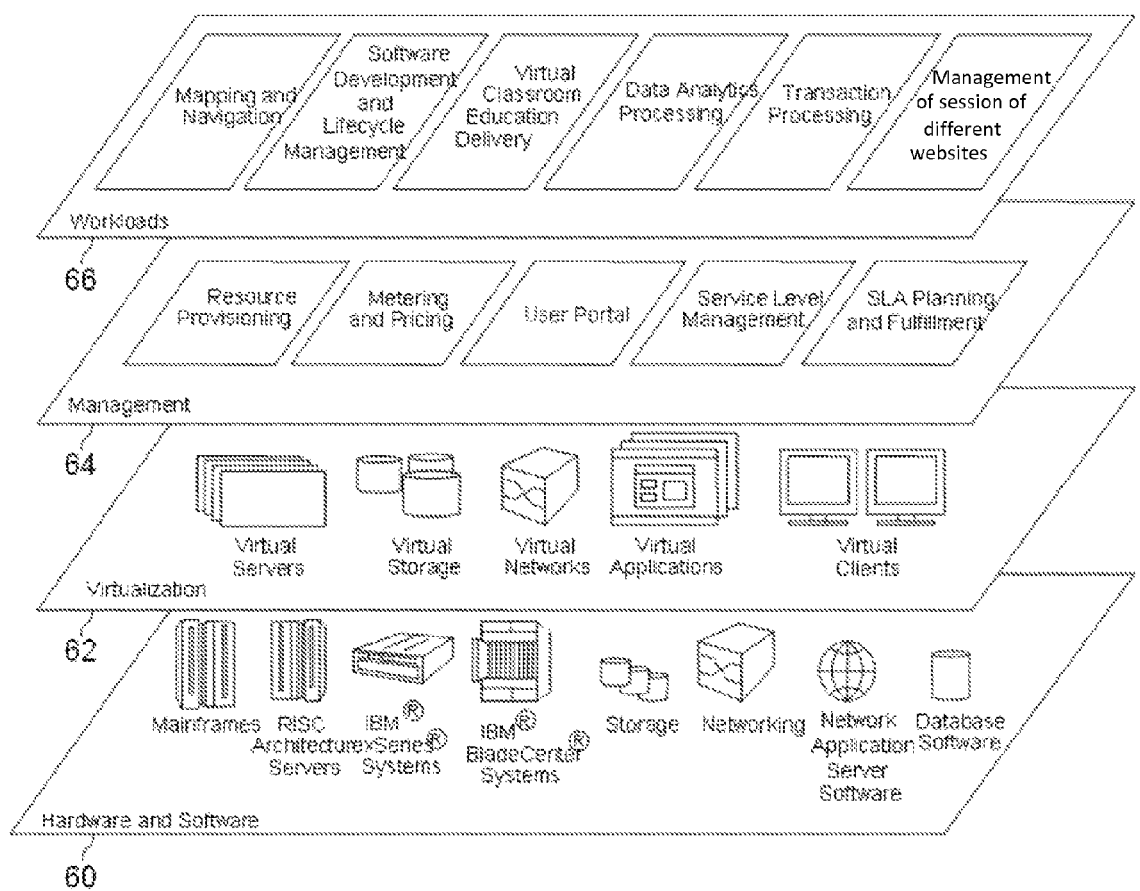
FIG. 3 depicts abstraction model layers according to an embodiment of the present invention.
Figure 4:
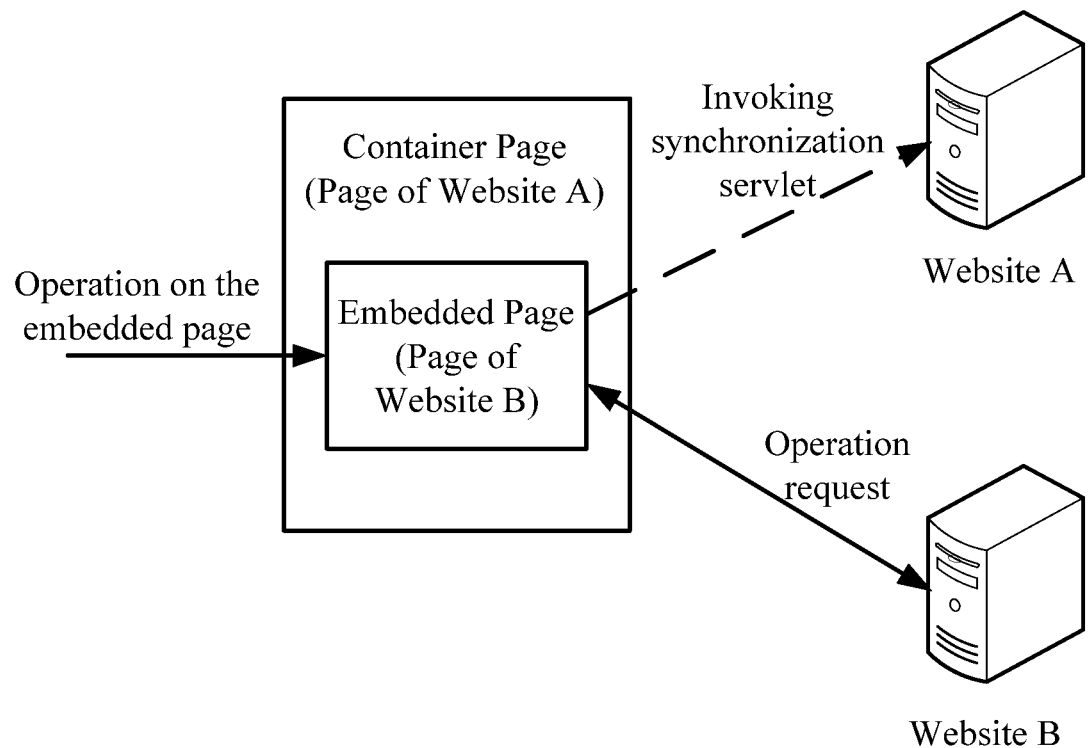
FIG. 4 is a schematic diagram of an example in which an existing approach is implemented.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and management of sessions of different websites according to embodiments of the present invention.

Figure 5:
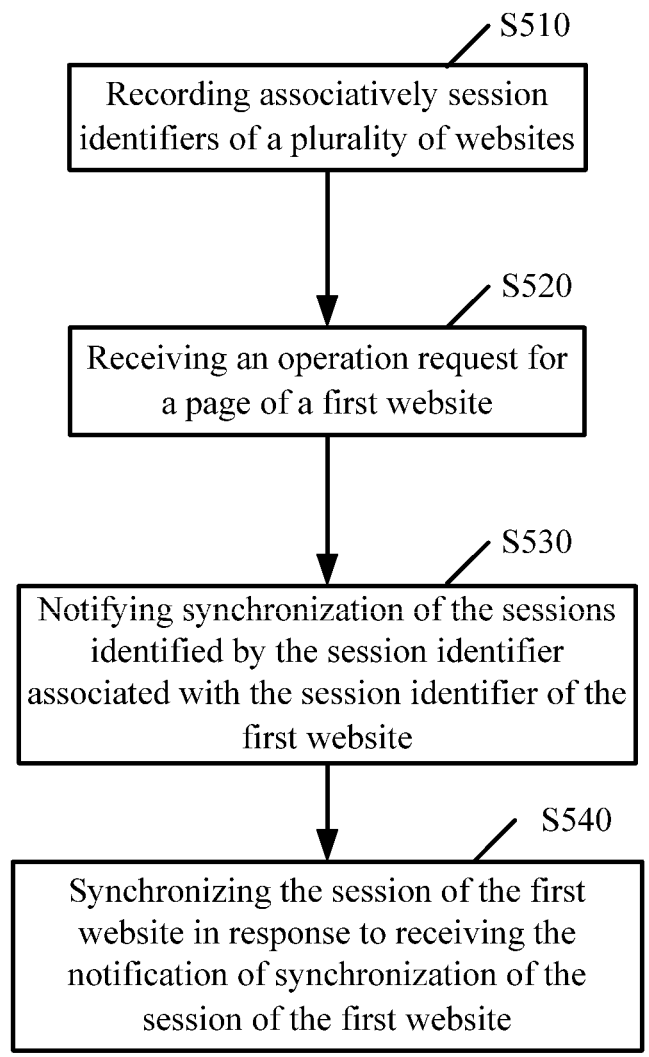
FIG. 5 is a schematic flowchart of the method for managing sessions of different websites according to an embodiment of the present invention.

FIG. 5 is a schematic flowchart of the method for managing sessions of different websites according to an embodiment of the present invention. The embodiment will be described below in detail with reference to the figure.

The main idea of the embodiments of the present invention is that, in the case that the pages of a plurality of websites are integrated into one page, the synchronization of the sessions can be initiated by a server of website, instead of the synchronization of sessions initiated by a client in the prior art.

The method of this embodiment can be performed at a server of a website. For the sake of convenience, the method of this embodiment performed at a server of a first website will be described as an example.

As shown in FIG. 5, at step S510, the session identifiers of a plurality of websites are recorded associatively. As mentioned above, a session of a website is established in response to opening a page of the website, and a session identifier is generated for the established session to identify the session. In this embodiment, the pages of the plurality of websites including the first website can be integrated into one page using, for instance, iFrame. In other words, the pages of other websites are embedded in one page of one website of the plurality of websites.

Figure 6:
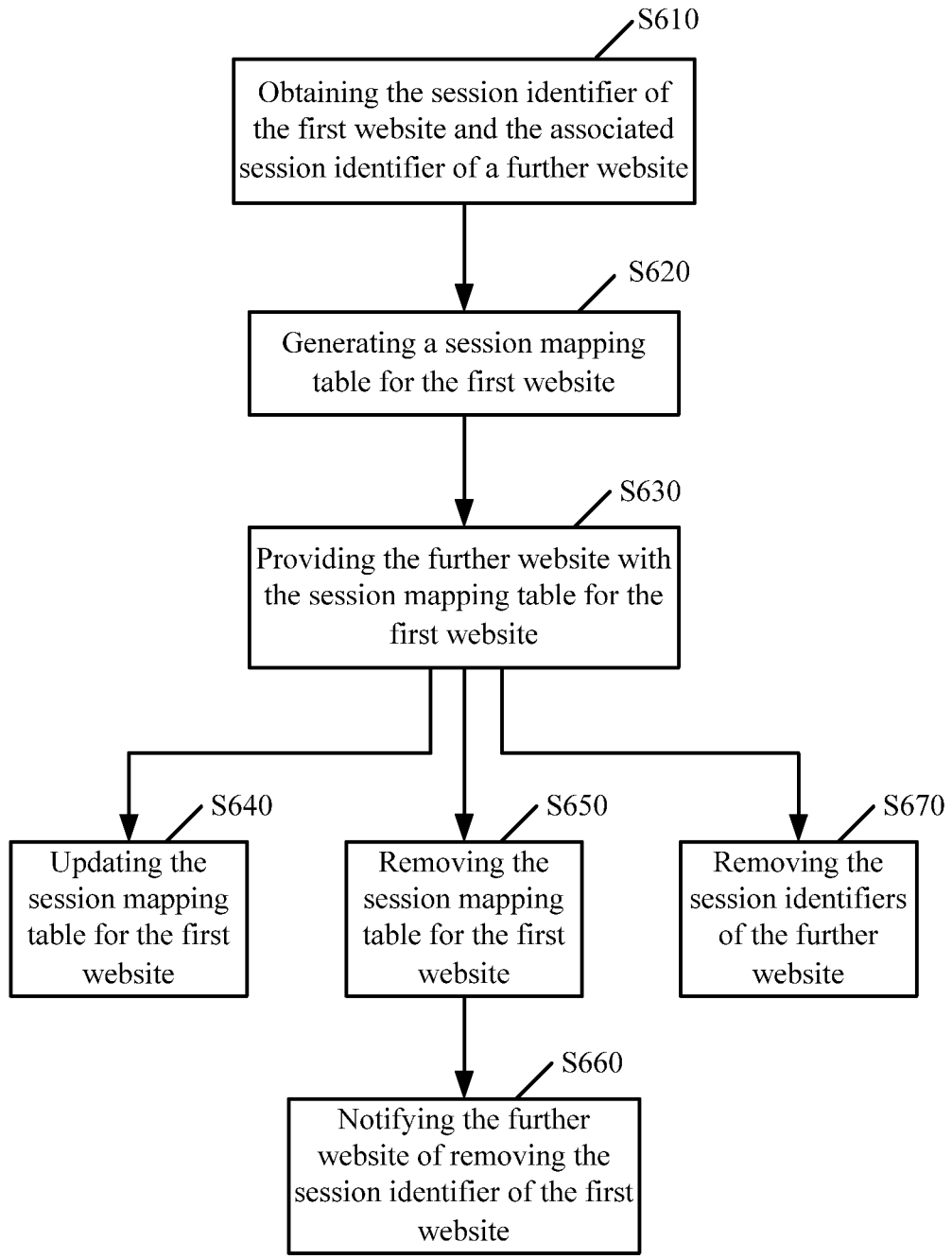
FIG. 6 is a schematic flowchart of recording associatively session identifiers of a plurality of websites in the embodiment of FIG. 5.

FIG. 6 shows a schematic flow chart of step S510. As shown in FIG. 6, after the page of the first website is opened on the browser of the client and the corresponding session identifier is generated, at step S610, the server of the first website can obtain the session identifier of the first website and the session identifiers of the other websites to which the pages integrated with the opened page of the first website into the same page belong. The session identifiers of the other websites can be generated after the pages of the respective websites are opened on the browser, and can be stored in the Cookie document at the client. Therefore, when the page of the first website is opened, the session identifiers of other websites may be obtained from the Cookie document at the client and provided to the first website together with the session identifier of the first website.

Then, at step S620, a session mapping table for the first website is generated, which can comprise the session identifiers of the first website and the other websites. A kind of format of the session mapping table may be "a session identifier of a website, <associated session identifier of a further website>", for example. In this embodiment, for the first website, the format of the generated session mapping table can be "the session identifier of the first website, <the session identifiers of the other websites>". Thus, the session mapping table may indicate clearly which session identifiers of the websites are associated with each other. It can be readily appreciated for those skilled in the art that the session mapping table may also be in other formats.

After the session mapping table is generated, at step S630, the generated session mapping table for the first website is provided to the other websites. After receiving the session mapping table for the first website, the other websites may generate or update their session mapping tables.

Further, at step S640, the session mapping table for the first website may be updated in response to receiving a session mapping table sent from another website. In an embodiment, the session identifier of another website in the session mapping table from another website can be added to the session mapping table for the first website to obtain the updated session mapping table for the first website.

Further, at step S650, the session mapping table for the first website may be removed in response to the end (such as timeout or termination) of the session of the first website. In the example in which the session mapping table employs the above format, the session mapping table for the first website "the session identifier of the first website, <the session identifiers of the other websites>", will be removed. Then, at step S660, the other websites in the session mapping table are notified to remove the session identifier of the first website. The other websites receiving the notification can remove the session identifier of the first website from their session mapping tables.

Moreover, at step S670, in response to receiving the notification of removing a session identifier of at least one website of the other websites, the session identifier of the at least one website designated in the notification may be removed from the session mapping table for the first website.

There is no explicit execution order between the steps S640, S650, S660 and S670, and those skilled in the art will understand that the step S640, the steps S650 to S660 and the step S670 can be performed independent from each other.

Then, returning to FIG. 5, at step S520, an operation request for the page of the first website is received. The operation request can comprise the session identifier of the first website. As mentioned above, when the user operates on the page of the website, the operation request will be sent to the server of the website. Then, at step S530, it can be notified of synchronization of the sessions identified by the session identifiers associated with the session identifier of the first website.

At step S530, first, the session identifier of the first website is extracted from the received operation request, and then based on the extracted session identifier of the first website, the session identifiers associated with the session identifier of the first website are determined, and thus the sessions of the websites to be synchronized could be determined. The associated session identifiers may be determined by checking the session mapping table for the first website. In this case, the associated session identifiers are the session identifiers of the other websites. Then, a session synchronization request message is generated. In an embodiment, the session synchronization request message may comprise the session identifier of the first website. Alternatively, the session synchronization request message may comprise the determined session identifiers associated with the session identifier of the first website. Then, the generated session synchronization request message is sent to the websites corresponding to the determined associated session identifiers, so that the receiving websites can reset the timeout of the relevant sessions in response to the session synchronization request message.

Then, at step S540, the session of the first website is synchronized in response to receiving a notification of synchronization of the session of the first website. In this embodiment, the notification may be a session synchronization request message from other associated websites. Upon receipt of the session synchronization request message, the timeout of the session of the first website can be reset. In the case that the received session synchronization request message comprises the session identifier of another website, the session mapping table for the first website is checked based on the received session identifier to determine the session identifier of the first website so as to determine the session to be synchronized. Then the timeout of the determined session is reset. Alternatively, in the case that the received session synchronization request message comprises the session identifier of the first website, the timeout of the session identified by the session identifier of the first website would be reset.

It can be seen from the above description that the method of this embodiment can solve the problem of the session timeout of other associated websites caused by operating on the page of one website for a long time, and the method of this embodiment enables the synchronization of the session of the different website to be initiated at the server of the website, which can reduce the code change of web application.

Although the first website is illustrated as an example in the above description of the embodiment, those skilled in the art will understand that the method according to the embodiment of the present invention may be applied to any website.

Next two application examples in which the method according to the embodiment is implemented will be described. With reference to the two application examples, those skilled in the art will understand the embodiments of the present invention more clearly.

Figure 7:
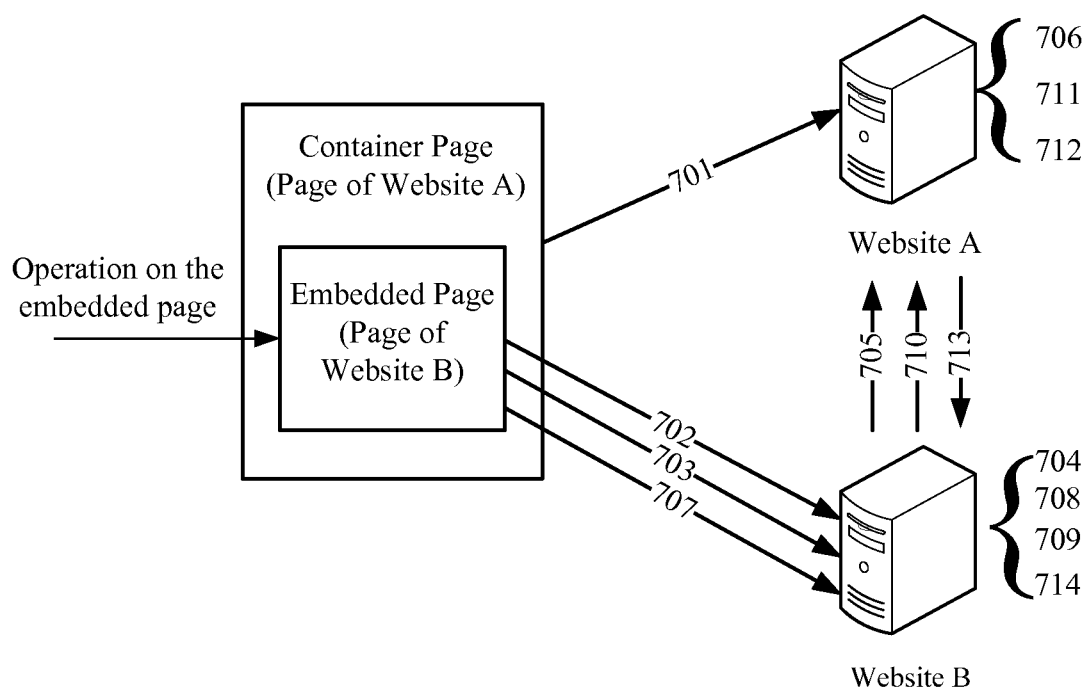
FIG. 7 is a schematic diagram of an application example in which the method for managing sessions of different websites according to the embodiment of the present invention is implemented.

FIG. 7 shows a schematic diagram of an application example in which the method for managing sessions of different websites according to the embodiment of the present invention is implemented. This application example relates to two websites: website A and website B. The method according to this embodiment may be performed at both servers of the websites A and B.

As shown in FIG. 7, the user opens the page of the website A at the client, and thus the session of the website A is established (701), and the session identifier thereof is "siteA#session#111".

Then, the user opens the page of the website B at the client via iFrame, and the page of the website B is embedded into the page of the website A. Correspondingly, the session of the website B is established (702), and the session identifier thereof is "siteB#session#222". The website B obtains (703) the session identifier "siteB#session#222" of the website B and the session identifier "siteA#session#111" of the website A. Then, for the website B, the session mapping table is generated (704) to record the session identifiers of the websites A and B associatively, i.e. "siteB#session#222, <siteA#session#111>". Then, the website B may send (705) a message to the website A to provide the session mapping table for the website B, "siteB#session#222, <siteA#session#111>", and the session mapping table for the website A is also generated (706) to record the session identifiers of the websites A and B associatively, i.e. "siteA#session#111, <siteB#session#222>". Thus, both websites A and B can establish their session mapping tables.

Assume that the user operates on the page of the website B, then the website B receives (707) an operation request and extracts the session identifier "siteB#session#222" of the website B from the operation request. Then, the website B checks (708) its session mapping table to obtain the associated session identifier of the website A, "siteA#session#111". The website B generates (709) a session synchronization request message which may comprise the session identifier of the website B "siteB#session#222" or the session identifier of the website A "siteA#session#111". Then, the session synchronization request message is sent (710) to the website A. If the session synchronization request message received by the website A comprises the session identifier of the website B "siteB#session#222", the website A may check its session mapping table based on the session identifier of the website B "siteB#session#222" to obtain the associated session identifier "siteA#session#111", and reset (711) the timeout of the identified session. If the received session synchronization request message comprises the session identifier of the website A "siteA#session#111", the website A can directly reset the timeout of the session identified by the session identifier "siteA#session#111". The case that the user operates on the page of the website A is similar to the case that the user operates on the page of the website B, and the difference is only the website A in the former case performs the operations for the website B in the latter case and the website B in the former case performs the operations for the website A in the latter case.

If the session of the website A time outs or terminates, the website A removes (712) the session mapping table "siteA#session#111, <siteB#session#222>", and notifies (713) the website B to remove the session identifier of the website A. Upon receipt of the notification, the website B removes (714) the session identifier of the website A from its session mapping table.

Figure 8:
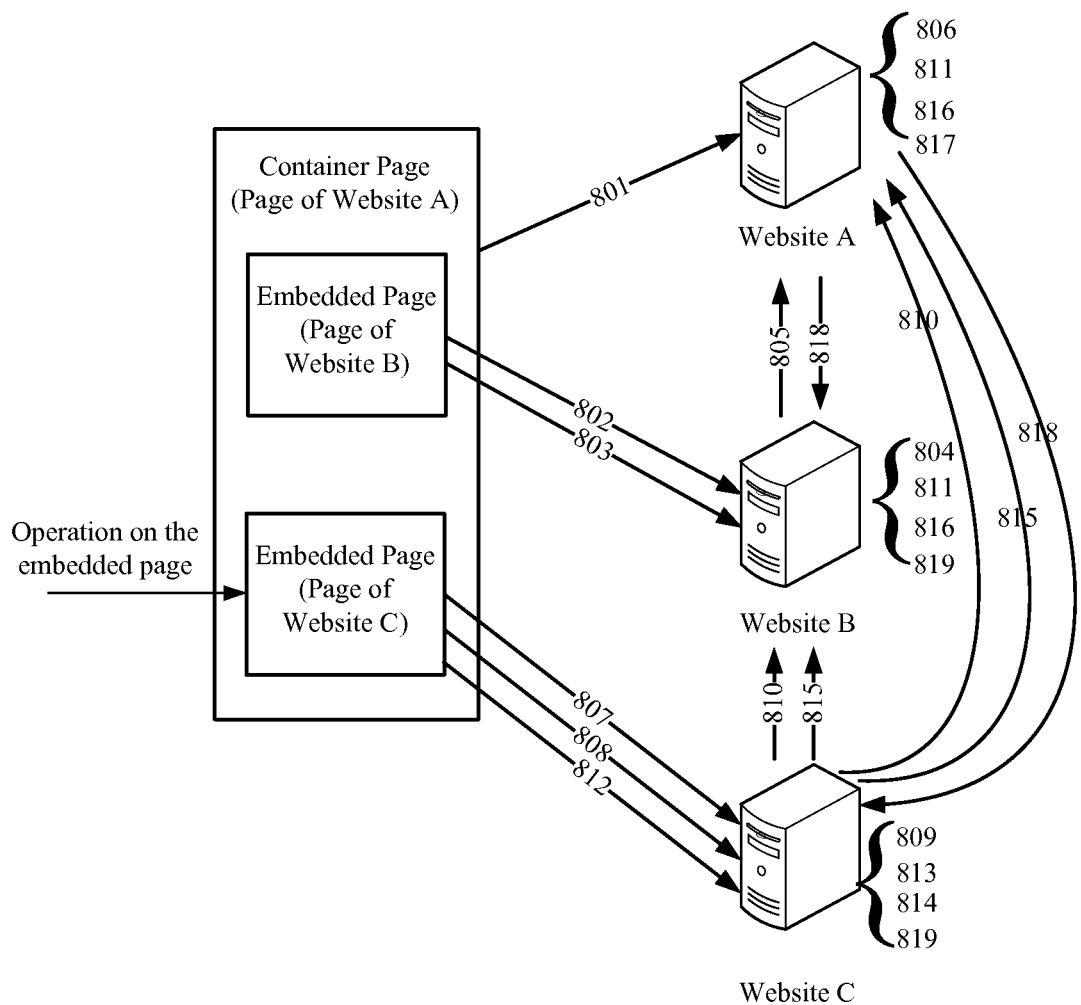
FIG. 8 is a schematic diagram of another application example in which the method for managing sessions of different websites according to the embodiment of the present invention is implemented.

FIG. 8 shows a schematic diagram of another application example in which the method for managing sessions of different websites according to the embodiment of the present invention is implemented. This application example relates to three websites: website A, website B and website C. The method according to this embodiment may be performed at the servers of the websites A, B and C.

As shown in FIG. 8, the user opens the page of the website A at the client, and thus the session of the website A is established (801), and the session identifier is "siteA#session#111".

Then, the user opens the page of the website B at the client via iFrame, and the page of the website B is embedded into the page of the website A. Correspondingly, the session of the website B is established (802), and the session identifier is "siteB#session#222". The website B obtains (803) the session identifier of the website B "siteB#session#222" and the session identifier of the website A "siteA#session#111". Then, for the website B, a session mapping table is generated (804) to record the session identifiers of the websites A and B associatively, i.e. "siteB#session#222, <siteA#session#111>". Then, the website B may send (805) a message to the website A to provide the session mapping table for the website B, "siteB#session#222, <siteA#session#111>", and the session mapping table for the website A is also generated (806) to record the session identifiers of the websites A and B associatively, i.e. "siteA#session#111, <siteB#session#222>".

Next, the user opens the page of the website C at the client via iFrame, and the page of the website C is also embedded into the page of the website A. Correspondingly, the session of the website C is established (807), and the session identifier is "siteC#session#333". The website C obtains (808) the session identifier of the website C and the session identifiers of the websites A and B, i.e. "siteC#session#333", "siteA#session#111", and "siteB#session#222". Then, the session mapping table for the website C is generated (809) to record the session identifiers of the websites A, B and C associatively, i.e. "siteC#session#333, <siteA#session#111, siteB#session#222>". Then, the website C may send (810) the messages to the websites A and B respectively to provide the session mapping table for the website C "siteC#session#333, <siteA#session#111, siteB#session#222>". When receiving the session identifier of the website C, the websites A and B respectively update (811) their session mapping tables, that is, the session identifier of the website C "siteC#session#333" can be added into the session mapping tables for the websites A and B respectively. Thus, the session mapping table for the website A is updated as "siteA#session#111, <siteB#session#222, siteC#session#333>", and the session mapping table for the website B is updated as "siteB#session#222, <siteA#session#111, siteC#session#333>".

Assume that the user operates on the page of the website C, the website C can receive (812) an operation request and extract the session identifier of the website C "siteC#session#333" from the operation request. Then, the website C checks (813) its session mapping table to obtain the associated session identifiers of the websites A and B "siteA#session#111" and "siteB#session#222". The website C generates (814) a session synchronization request message and sends (815) the session synchronization request message to the websites A and B. The session synchronization request message may comprise the session identifier of the website C "siteC#session#333". In this case, upon receipt of the session synchronization request message, the websites A and B check (816) their own session mapping tables based on the session identifier in the session synchronization request message to determine the associated session identifiers "siteA#session#111" and "siteB#session#222", and reset the timeout of the sessions identified by the determined associated session identifiers. Alternatively, the session synchronization request message may comprise the session identifiers of the websites A and B "siteA#session#111" and "siteB#session#222". In this case, upon receipt of the session synchronization request message, the websites A and B directly reset the timeout of the sessions identified by the session identifiers "siteA#session#111" and "siteB#session#222" respectively.

The case that the user operates on the page of the website A or website B is similar to the case that the user operates on the page of website C, so the corresponding description will be omitted.

If the session of the website A time outs or terminates, the website A will remove (817) its session mapping table "siteA#session#111, <siteB#session#222, siteC#session#333>", and notifies (818) the websites B and C to remove the session identifier of the website A from their respective session mapping tables. Upon receipt of the notification, the websites B and C remove (819) the session identifier of the website A from their own session mapping tables. Now, the session mapping table for the website B becomes "siteB#session#222, <siteC#session#333>", and the session mapping table for the website C becomes "siteC#session#333, <siteB#session#222>".

Figure 9:
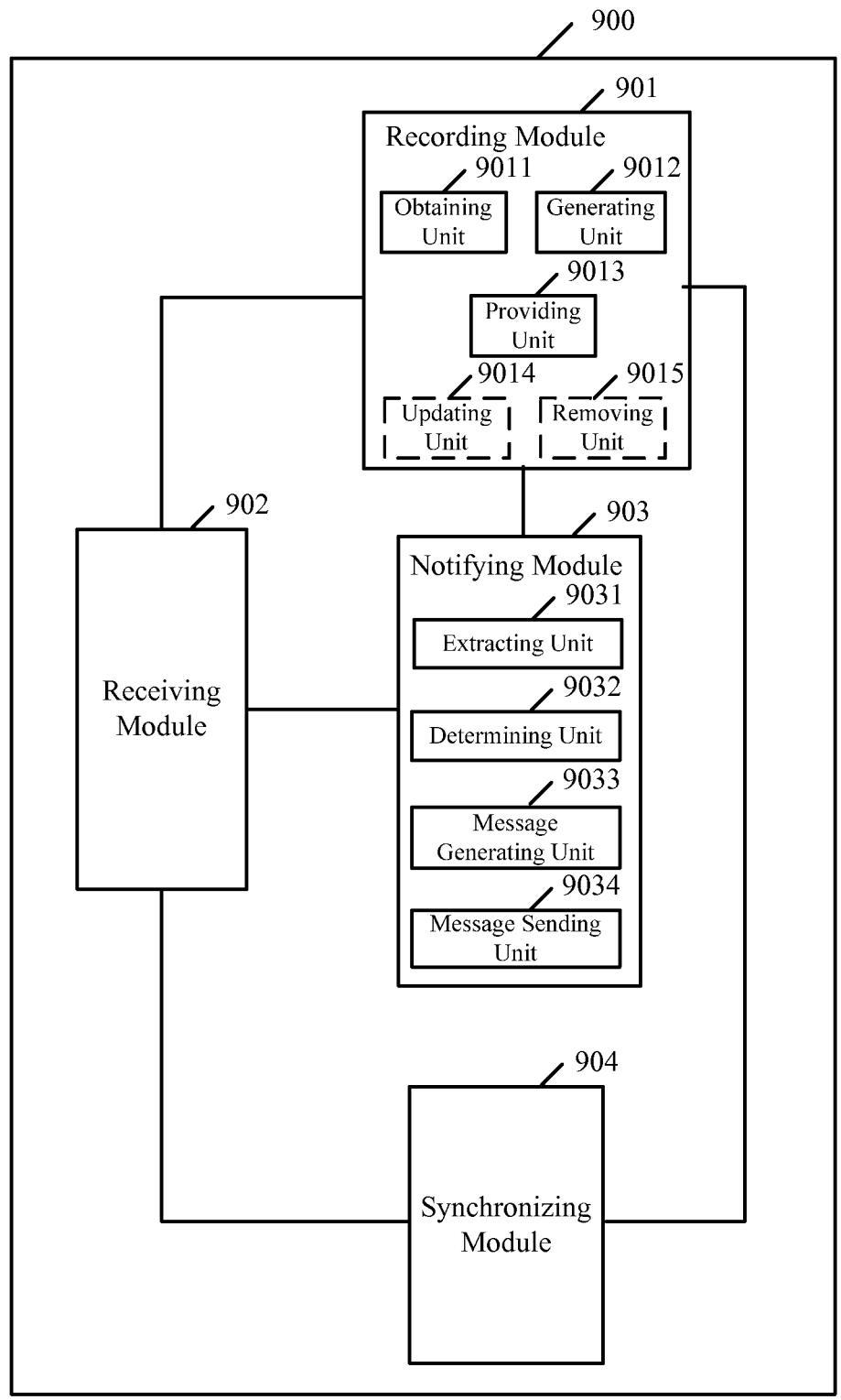
FIG. 9 is a schematic block diagram of the apparatus for managing sessions of different websites according to an embodiment of the present invention.

Under the same concept, FIG. 9 shows a schematic block diagram of the apparatus 900 for managing sessions of different websites according to an embodiment of the present invention. This embodiment will be described below in detail with reference to the figure, wherein for the parts that are same as those of the previous embodiment, their description will be properly omitted.

In this embodiment, the sessions of a plurality of websites including a first website are established in response to a page open operation on the respective websites. The pages of the websites are integrated into one page, for instance, via iFrame. The apparatus 900 of this embodiment may be installed at the server of website. Next, for the sake of convenience, the apparatus 900 at the server of the first website will be described as an example.

As shown in FIG. 9, the apparatus 900 of this embodiment comprises: a recording module 901 configured to record associatively the session identifiers of the plurality of websites; a receiving module 902 configured to receive a operation request for the page of the first website, the operation request comprising the session identifier of the first website; a notifying module 903 configured to notify synchronization of the session identified by the session identifier associated with the session identifier of the first website; and a synchronizing module 904 configured to synchronize the session of the first website in response to receiving the notification of synchronization the session of the first website.

In the apparatus 900 of this embodiment, the recording module 901 records the session identifiers of the plurality of websites associatively. After the page of the first website is opened on the browser of the client and the corresponding session identifier is generated, in the recording module 901, an obtaining unit 9011 obtains the session identifier of the first website and the session identifier of other website to which other page integrated with the page of the first website in the same page belongs. As mentioned above, when the page of the first website is opened, the session identifier of other website may be obtained from the Cookie at the client and provided to the first website together with the session identifier of the first website. Then, a generating unit 9012 generates the session mapping table for the first website. The session mapping table can comprise the session identifier of the first website and the session identifier of other website. In this embodiment, the session mapping table may employ the above described format. After the session mapping table for the first website is generated, a providing unit 9013 may provide the session mapping table to other website. Other website may generate or update its session mapping table based on the obtained session mapping table.

In another embodiment, the recording module 901 may further comprise an updating unit 9014. When the receiving module 902 receives the session mapping table sent from another website, the updating unit 9014 updates the session mapping table for the first website. In an embodiment, the updating unit 9014 can update the session mapping table for the first website by adding the session identifier of another website into the session mapping table for the first website.

In a further embodiment, the recording module 901 may further comprise a removing unit 9015. When the session of the first website time outs or terminates, the removing unit 9015 can remove the session mapping table for the first website, and then the notifying module 903 notifies other website in the removed session mapping table to remove the session identifier of the first website. Alternatively, the removing unit 9015 may further remove the session identifier of at least one website from the session mapping table for the first website when the receiving module 902 receives the notification of removal of the session identifier of the at least one website.

Then, the receiving module 902 receives the operation request for the page of the first website. The operation request may comprise the session identifier of the first website. Then, the notifying module 903 notifies synchronization of the session identified by the session identifier associated with the session identifier of the first website. In the notifying module 903, an extracting unit 9031 can extract the session identifier of the first website from the received operation request, and then a determining unit 9032 can determine the associated session identifier based on the extracted session identifier of the first website, for example, by checking the session mapping table for the first website, so as to determine the session of website to be synchronized. Next, a message generating unit 9033 can generate a session synchronization request message. In an embodiment, the session synchronization request message may comprise the session identifier of the first website. Alternatively, the session synchronization request message may comprise the determined session identifier associated with the session identifier of the first website. Then, a message sending unit 9034 sends the session synchronization request message to the website corresponding to the determined session identifier, so that the receiving website can reset the timeout of the relevant session in response to the session synchronization request message.

Furthermore, the receiving module 902 may further receive a notification of synchronization of the session of the first website. In this embodiment, the notification may be the session synchronization request message from another website. Then, the synchronizing module 904 can synchronize the session of the first website in response to the notification. In an embodiment, the notification may comprise the session identifier of another website. In this case, the synchronizing module 904 may check the session mapping table for the first website based on the received session identifier to determine the associated session identifier to determine the session to be synchronized. Then the synchronizing module 904 may reset the timeout of the determined session. In another embodiment, the notification may comprise the session identifier of the first website. In this case, the synchronizing module 904 may reset the timeout of the session identified by the session identifier of the first website.

It should be noted that the apparatus 900 of this embodiment is operable to implement the method for managing sessions of different websites shown in FIGS. 5 and 6.

As described herein, according to an aspect of the present invention, there is provided a method for managing sessions of different websites, which comprises: recording associatively session identifiers of a plurality of websites, wherein the respective session identifiers of the plurality of websites identifies a session established in response to a page open operations for the respective websites, and the pages of the plurality of websites are integrated into one page; receiving an operation request for a page of a first website of the plurality of websites, the operation request comprising the session identifier of the first website; notifying synchronization of the session identified by the session identifier associated with the session identifier of the first website; and synchronizing the session of the first website in response to receiving a notification of synchronization of the session of the first website.

According to another aspect of the present invention, there is provided an apparatus for managing sessions of different websites, which comprises: recording module configured to record associatively session identifiers of a plurality of websites, wherein the respective session identifiers of the plurality of websites identifies a session established in response to a page open operation for the respective websites, and the pages of the plurality of websites are integrated into one page; request receiving module configured to receive an operation request for a page of a first website of the plurality of websites, the operation request comprising the session identifier of the first website; notifying module configured to notify synchronization of the session identified by the session identifier associated with the session identifier of the first website; and synchronizing module configured to synchronize the session of the first website in response to receiving a notification of synchronization of the session of the first website.

According to another aspect of the present invention, there is provided a server which comprises the above mentioned apparatus for managing sessions of different websites.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing sessions of different websites, the method comprising:
   recording, by a website server, respective session identifiers of a plurality of websites, wherein each of the respective session identifiers of the plurality of websites identifies a session, wherein the session is a communication session in which a client accesses a website from the plurality of websites via the website server, and wherein pages of the plurality of websites are integrated into one page on one website from the plurality of websites;
   obtaining, by the website server, the session identifier of the first website and a session identifier of a further website to which a further page integrated with the page from the first website into the one page belongs;
   generating, by the website server, a session mapping table for the first website, wherein the session mapping table comprises the session identifier of the first website and the session identifier of the further website;
   providing, by the website server, the further website with the session mapping table;
   receiving, by the website server and from the client via a network connection, an operation request, wherein the operation request requests a page from a first website from the plurality of websites, and wherein the operation request comprises a session identifier of the first website;
   in response to receiving the operation request, generating and transmitting, by the website server, a session synchronization request message that requests that a session of the first website be synchronized with sessions of all other websites from the plurality of websites, wherein synchronizing the first website with all other websites from the plurality of websites causes all of the plurality of websites to timeout at a same time, and wherein the timeout causes all of the plurality of websites to terminate their respective sessions with the website server at the same time;
   directing, by the website server, all of the plurality of websites to timeout at the same time, wherein the session of the first website is synchronized with the sessions of the plurality of websites that receive the session synchronization request message;

removing, by the website server, the session mapping table from the first website in response to ending the session of the first website; and notifying, by the website server, the further website of removing the session mapping table from the first website.

2. The method according to claim 1, further comprising:
updating, by the website server, the session mapping table for the first website in response to receiving another session mapping table sent from another website.

3. The method according to claim 1, further comprising:
removing, by the website server, the session identifier of the further website from the session mapping table in response to receiving a notification of a removal of at least one page of at least one website from the session mapping table.

4. The method according to claim 1, further comprising:
extracting, by the website server, the session identifier of the first website from the operation request;
determining, by the website server, an associated session identifier based on the session identifier of the first web site;
generating, by the website server, another session synchronization request message; and
sending, by the website server, said another session synchronization request message to a website corresponding to the determined associated session identifier, wherein the website corresponding to the determined associated session identifier resets a timeout of an associated session in response to said another session synchronization request message.

5. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:

program instructions to record associated session identifiers of a plurality of websites, wherein each respective associated session identifier of the plurality of websites identifies a session, wherein the session is a communication session in which a client accesses a website from the plurality of websites via the website server, and wherein pages from the plurality of websites are integrated into one page on a single website from the plurality of websites;

program instructions to obtain the session identifier of the first website and a session identifier of a further website to which a further page integrated with the page from the first website into the one page belongs;

program instructions to generate a session mapping table for the first website, the session mapping table comprising the session identifiers of the first website and the further website;

program instructions to provide the further website with the session mapping table;

program instructions to receive from the client an operation request, wherein the operation request requests a page from a first website from the plurality of websites, and wherein the operation request comprises a session identifier of the first website;

program instructions to, in response to receiving the operation request, generate and transmit a session synchronization request message that requests that a session of the first website be synchronized with sessions of all other websites from the plurality of websites, wherein synchronizing the first website with all other websites from the plurality of websites causes all of the plurality of websites to timeout at a same time, and wherein the timeout causes all of the plurality of websites to terminate their respective sessions with the website server at the same time;

program instructions to direct all of the plurality of websites to timeout at the same time, wherein the session of the first website is synchronized with the sessions of the plurality of websites that receive the session synchronization request message;

program instructions to remove the session mapping table for the first website in response to an end of the session of the first website; and program instructions to notify the further website of removing the session identifier of the first website.

6. The computer system according to claim 5, further comprising:
program instructions to update the session mapping table for the first website in response to receiving a session mapping table sent from another website.

7. The computer system according to claim 5, further comprising:
program instructions to remove a session identifier of at least one website from the session mapping table in response to receiving a notification of removing the session identifier of the at least one web site.

8. The computer system according to claim 5, further comprising:
program instructions to extract the session identifier of the first website from the operation request;
program instructions to determine an associated session identifier based on the session identifier of the first website;
program instructions to generate another session synchronization request message; and
program instructions to send said another session synchronization request message to a website corresponding to the determined associated session identifier, wherein the website corresponding to the determined associated session identifier resets a timeout of an associated session in response to said another session synchronization request message.

9. A computer program product for managing sessions of different websites, the computer program product comprising a non-transitory computer readable storage medium having program code embodied therewith, the program code readable and executable by a processor to perform a method comprising:

recording respective session identifiers of a plurality of websites, wherein each of the respective session identifiers of the plurality of websites identifies a session, wherein the session is a communication session in which a client accesses a website from the plurality of websites via the website server, and wherein pages of the plurality of websites are integrated into one page on one website from the plurality of websites, wherein recording respective session identifiers of the plurality of websites comprises:

obtaining the session identifier of the first website and a session identifier of a further website to which a further page integrated with the page from the first website into the one page belongs;

generating a session mapping table for the first website, wherein the session mapping table comprises the session identifier of the first website and the session identifier of the further website; and providing the further website with the session mapping table;

receiving, by the website server and from the client via a network connection, an operation request, wherein the operation request requests a page from a first website from the plurality of websites, and wherein the operation request comprises a session identifier of the first website;

in response to receiving the operation request, generating and transmitting a session synchronization request message that requests that a session of the first website be synchronized with sessions of all other websites from the plurality of websites, wherein synchronizing the first website with all other websites from the plurality of websites causes all of the plurality of websites to timeout at a same time, and wherein the timeout causes all of the plurality of websites to terminate their respective sessions with the website server at the same time;

directing all of the plurality of websites to timeout at the same time, wherein the session of the first website is synchronized with the sessions of the plurality of websites that receive the session synchronization request message;

removing the session mapping table from the first website in response to ending the session of the first website;

notifying the further website of removing the session mapping table from the first website.

10. The computer program product of claim 9, wherein recording respective session identifiers of the plurality of websites further comprises:

updating the session mapping table for the first website in response to receiving another session mapping table sent from another website.

11. The computer program product of claim 9, wherein recording respective session identifiers of the plurality of websites further comprises:

removing a session identifier of the further website from the session mapping table in response to receiving a notification of a removal of at least one page of at least one website from the session mapping table.

12. The computer program product of claim 9, wherein the method further comprises:

extracting the session identifier of the first website from the operation request;

determining an associated session identifier based on the session identifier of the first website;

generating another session synchronization request message; and sending said another session synchronization request message to a website corresponding to the determined associated session identifier, wherein the website corresponding to the determined associated session identifier resets a timeout of an associated session in response to said another session synchronization request message.

* * * * *